C. DE MATTIA.
MASSAGING TOOL.
APPLICATION FILED AUG. 23, 1915.
1,192,282.
Patented July 25, 1916.
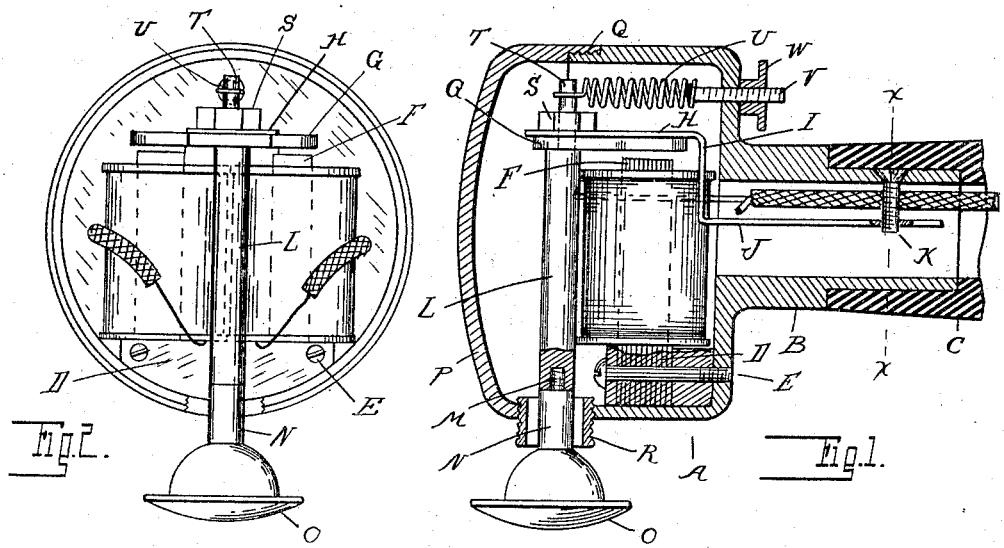
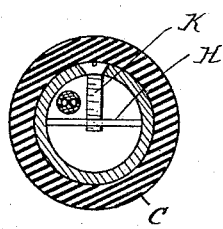
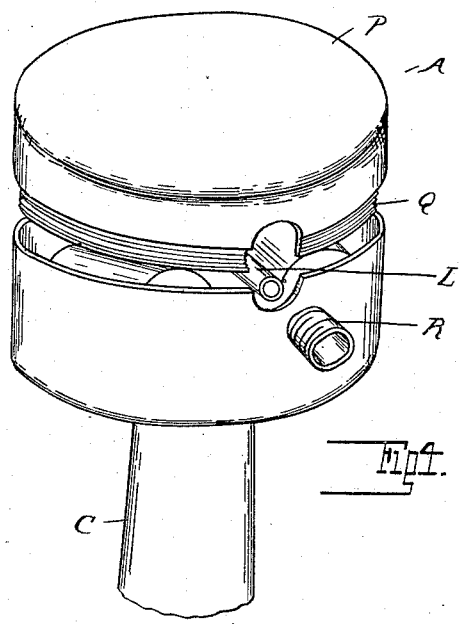
Inventor
Constant De Mattia
By Whittemore Hulbert & Whittemore
Attorneys

UNITED STATES PATENT OFFICE.

CONSTANT DE MATTIA, OF DETROIT, MICHIGAN.

MASSAGING-TOOL.

1,192,282.　　　　　Specification of Letters Patent.　　Patented July 25, 1916.

Application filed August 23, 1915.　Serial No. 46,900.

*To all whom it may concern:*

Be it known that I, CONSTANT DE MATTIA, a citizen of the United States of America, residing at Detroit, in the county of Wayne and State of Michigan, have invented certain new and useful Improvements in Massaging-Tools, of which the following is a specification, reference being had therein to the accompanying drawings.

The invention relates to electrically operated vibrators, such as designed for use as massaging tools and for similar purposes, and it is the object of the invention to devise a simple and efficient construction as hereinafter set forth.

In the drawings: Figure 1 is a longitudinal section through my improved construction of tool; Fig. 2 is an end elevation with the cap removed; Fig. 3 is a section on line *x—x* Fig. 1; and Fig. 4 is a perspective view showing the cap and the locking means therefor detached.

A is a casing having a body portion preferably of circular form, and a reduced shank portion B for attachment of a hollow handle C. Within the body portion is arranged an electro-magnet D, preferably of the horseshoe type, and secured to the casing by suitable means, such as the screws E. The poles F of this magnet are arranged at one side of the center of the casing, and adjacent thereto is an armature G which is mounted upon a vibrator spring arm H. This arm is bent at I to extend to the central plane of the casing, and is then bent again at J to extend within the hollow shank B, its end portion being secured by a screw K. By thus running this spring arm into the shank B a sufficient length is obtained for proper vibratory action without increasing the dimensions of the body of the casing.

At the free end of the spring arm H is attached the tool-holding shank L, which extends transversely of the case. The end of this shank terminates just inside the case and is provided with a threaded socket M for engagement of the shank N of the tool O. The case is closed by a cap or cover P, which has a threaded engagement with the body of the case at Q. The aperture through which the tool shank N passes is formed partly in the cap and partly in the case, and is bushed by a member R having a threaded engagement with the members A and B, and when inserted forming a lock for preventing the disengagement of the cap. The shank L is attached to the spring arm H, preferably by having a threaded portion passing through an aperture therein and locked by a nut S. There is also an extension T, which is connected with a spring U, the opposite end of said spring being attached to a shank V passing out through an aperture in the case and threaded to engage an adjusting thumb nut W. Thus by adjusting the nut W the tension of the spring may be altered to obtain the proper vibratory action.

In operation the tool is designed for use with alternating current, the vibrations being automatically produced thereby. By adjusting the nut W the character of the vibratory action may be altered to produce any effect desired. The structure is exceedingly simple and direct in its action, and may be manufactured at low cost.

What I claim as my invention is:—

1. A massaging tool, comprising a casing having a hollow head portion and hollow shank, an electro-magnet located in the head portion, an armature therefor, a vibrator arm attached to said armature and extending into said shank, means for anchoring the end of said arm, a shank extending laterally from the free end of said vibrator arm and passing out from the case, and a tool outside the case secured to said shank and operated thereby.

2. A massaging tool, comprising a case having a hollow head portion and a hollow shank, a horseshoe electro-magnet arranged in said hollow head with its poles at one side of the axis of the shank, an armature for said magnet, a vibrator secured to said armature and laterally offset into the central plane of said shank and extending therein, securing means for the end of said vibrator in said hollow shank, a shank connected to the free end of said vibrator extending laterally therefrom in registration with an aperture in said case, and a tool having a shank extending through said aperture and engaging the shank within the case.

3. A massaging tool, comprising a case having a hollow head portion and a hollow shank, a horseshoe electro-magnet secured within said hollow head and having its poles arranged at one side of the plane of the axis of said shank, an armature for said magnet, a vibrator secured to said armature and offset into the plane of said hollow shank, extending thereinto, securing means for said vibrator within said shank, a rod or shank secured to the free end of said vibrator and extending laterally within said hollow head, a cap for said casing having a threaded engagement therewith, said cap and casing being apertured in registration with said laterally-extending shank, a bushing engaging the aperture of said cap and casing and locking the same from disengagement, and a tool having its shank extending through said bushing and into engagement with said laterally-extending shank within the case.

4. A massaging tool, comprising a hollow casing having a hollow shank, a horseshoe electro-magnet secured within said casing having its poles at one side of the plane of said hollow shank, an armature for said magnet, a vibrator secured to said armature laterally offset into the plane of said hollow shank and extending into the same, means for securing the end of said vibrator within said shank, a rod or shank secured to the free end of said vibrator, extending laterally therefrom into registration with an aperture in said case, a tool having its shank passing through said aperture and engaging said laterally-extending shank, an extension of said laterally-extending shank upon the opposite side of said vibrator, a spring secured to said extension, and an adjusting screw attached to the opposite end of said spring and extending out through said case, whereby the tension of said spring may be altered.

In testimony whereof I affix my signature in presence of two witnesses.

CONSTANT De MATTIA.

Witnesses:
WM. J. BELKNAP,
H. E. BOWMAN.